Feb. 13, 1968  W. HOTINE  3,369,135

MAGNETOSTRICTIVE VIBRATORY ELECTRIC MOTOR

Filed Jan. 4, 1965  2 Sheets-Sheet 1

INVENTOR.
William Hotine

Feb. 13, 1968 W. HOTINE 3,369,135
MAGNETOSTRICTIVE VIBRATORY ELECTRIC MOTOR
Filed Jan. 4, 1965 2 Sheets-Sheet 2
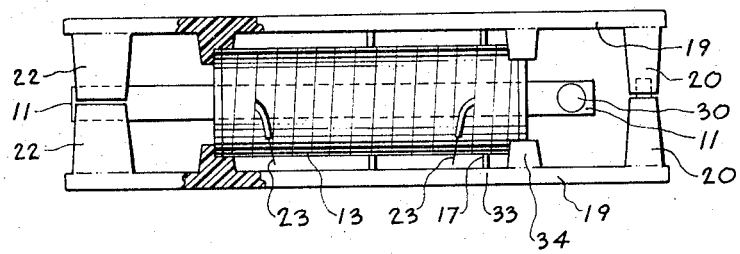
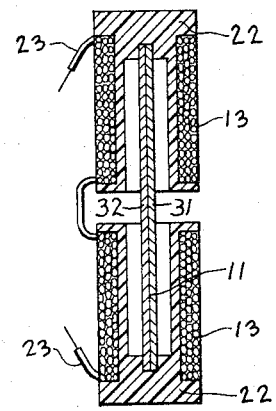
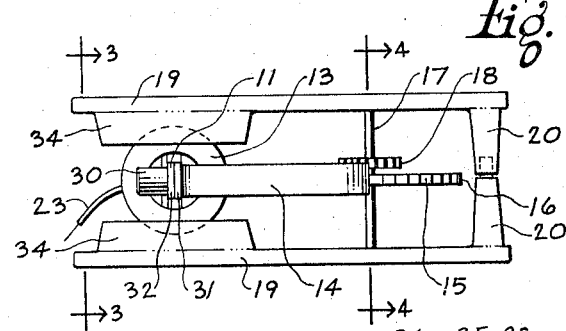
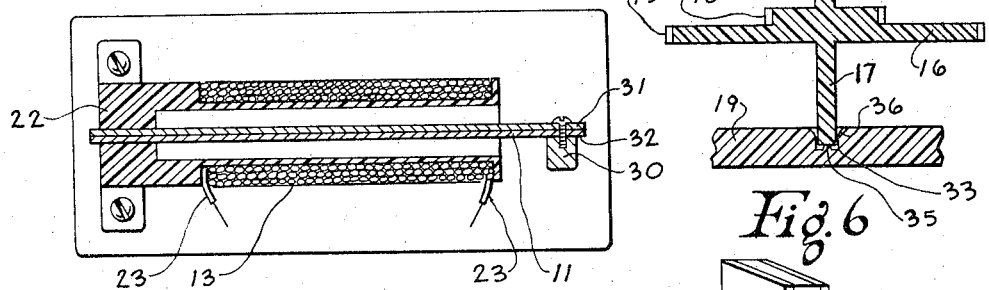
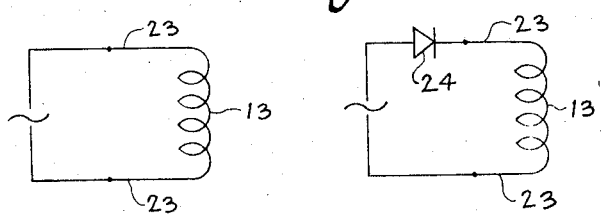
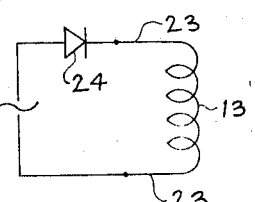
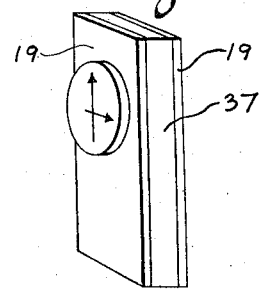
INVENTOR.
William Hotine

United States Patent Office 3,369,135
Patented Feb. 13, 1968

3,369,135
MAGNETOSTRICTIVE VIBRATORY
ELECTRIC MOTOR
William Hotine, Star Rte., Box 98,
Idyllwild, Calif. 92349
Filed Jan. 4, 1965, Ser. No. 423,172
6 Claims. (Cl 310—21)

This invention relates to general to vibratory electric motors, and more particularly to electric motors or transducers utilizing a flexible vibrating element.

The novel motor or transducer translates the electrical energy supplied to its solenoid winding into vibration of a flexible bimetal reed, or reciprocally, translates vibration of a flexible bimetal reed into an electrical output from its solenoid winding.

Previous electric motors of the vibratory type have used stiff resonant members such as tuning forks and have required electronic feedback means to maintain oscillation.

An object of this invention is to provide a simple and economical vibratory electric motor for incorporation in devices which may utilize a vibrating member in their operation.

Another object of this invention is to provide a vibratory transducer capable of furnishing an electrical output which is a function of vibratory input.

A further object of this invention is to utilize a magnetostrictively driven flexible bimetal reed as the vibrating member of a vibratory synchronous electric motor adapted to drive an electric clock.

Another further object of this invention is to provide a vibratory type of electric motor capable of convenient incorporation between spaced mounting plates which may also act as the pivot bearing plates of a clock gear train structure.

A yet further object of this invention is to provide a vibratory electric motor and associated gear train mounted between pivot plates formed on external surfaces for furnishing an enclosure and formed on internal surfaces for furnishing pivot bearings and motor supports.

A still further object of this invention is to provide a highly economical electric clock motor which uses molded plastic pivot bearings in molded mounting plates which are part of a clock enclosure, the bearings being adaptable to automatic assembly methods.

Other and further objects of this invention will be apparent from the following description presented in relation to the drawings, and the claims appended hereto.

The drawings illustrate suitable modifications of the electric motor of this invention.

FIGURE 4 is an end elevation of an electric motor similar in plan view to FIGURE 2 incorporated between molded plastic pivot plates of a clock gear train;

FIGURE 5 is a side elevation partially broken away of the structure of FIGURE 4;

FIGURE 6 is an enlarged sectional view of a typical gear pivot bearing structure of FIGURES 4 and 5;

FIGURE 7 is a perspective view of an electric clock having an enclosure partially formed by the mounting plates of an integral vibratory electric motor and gear train;

FIGURE 8 is a sectional view of a basic vibratory electric motor or transducer showing the vibrating reed held fixed at one end by the coil mounting;

FIGURE 9 is a sectional view of an alternate basic vibratory electric motor or transducer showing the vibrating reed held fixed at both ends by the coil mounting;

FIGURE 10 is a schematic diagram of the electric motor showing half wave operation by using a diode in series with the alternating current supply; and FIGURE 11 is a schematic diagram of the electric motor showing full wave operation from an alternating current supply.

Similar numbers refer to similar parts throughout the figures of the drawings.

Figure 1:
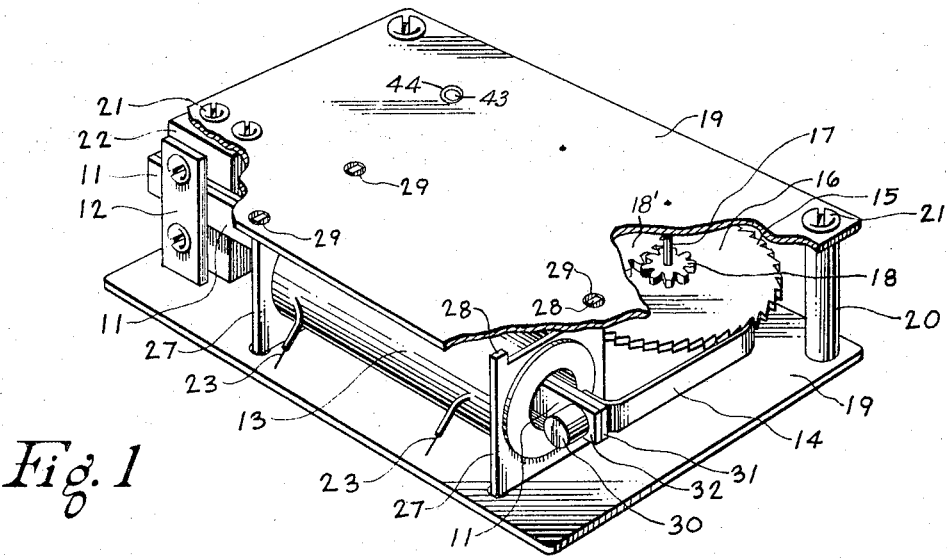
FIGURE 1 is a perspective view partly broken away of an electric vibratory motor incorporated between metal pivot bearing plates suitable for use with a clock gear train.
Figure 2:
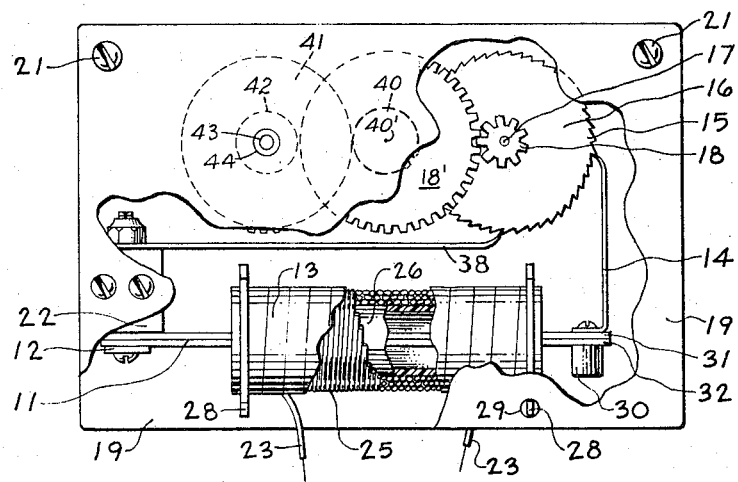
FIGURE 2 is a plan view partially broken away of the motor of FIGURE 1, showing the driving pawl attached to the end of the vibrating reed.

Referring to the drawings in greater detail, the improved vibratory electric motors illustrated in FIGURES 1 to 5 have a magnetostrictive bimetal vibrating reed 11 held fixed at one end, clamped to members 12 and 22. The reed 11 extends through solenoid motor windings or driving coils 13, and has a flat spring driving pawl 14 attached to it at a freely vibrating portion. The end of driving pawl 14 engages the ratchet teeth 15 of output wheel 16, converting the oscillating or vibrating motion of reed 11 to a rotary motion of wheel 16 by driving wheel 16 one tooth at a time. Wheel 16 is mounted on pivot shaft 17, which carries output drive pinion gear 18. Pinion gear 18 drives the clock gear train shown at 18' and 40–43, which is mounted between mounting or pivot plates 19. Spacers 20 and clamp members 22 serve to space and locate the pivot plates 19. Screws 21 are used as fasteners for members 20 and 22. As shown in FIG. 2 gear 18' drives a pinion gear 40 mounted on shaft 40'; gear 40 driving a gear 41 mounted on a shaft 43 which in turn drives an output gear 42. Shaft 43 extends via suitable bearings through an aperture 44 in upper plate 19, as shown in FIGS. 1 and 2, thus providing output via shaft 43 or gear 42.

The solenoid windings or coils 13 are provided with power input connecting lead wires 23. The alternating current supply voltage is connected to lead wires 23 as shown in the schematic diagram of FIGURE 11, or a diode rectifier 24 may be placed in series with the motor winding 13 as shown in FIGURE 10. The direct connection of FIGURE 11 will cause a vibration of reed 11 at twice the frequency of the input voltage, as the magnetostrictive effect on reed 11 will take place twice in each cycle of the alternating current supply. The use of diode 24 in series with the motor winding or coil 13 as shown in the schematic diagram of FIGURE 10 results in half wave magnetostrictive effect on reed 11 which will then vibrate at the frequency of the input voltage.

The magnetostrictive bimetal vibrating reed 11 is a bimetal strip, with the two metals of the strip having differing magnetostrictive properties. Magnetostriction in a metal is evidenced by a dimensional change of the metal when it is placed in a magnetic field. The two metals of a thin bimetal strip, having differing magnetostrictive properties, will cause a bending motion of the strip when it is subjected to a magnetic flux, in a similar manner to previous bimetallic thermostatic strips which were subjected to heating. Various geometrical forms of thermostatic elements which are well known in the thermostatic art are adaptable to use as magnetostrictive elements. The internal mechanism producing the deflection of a bimetal strip is the end force of an expanding or contracting metal, one side of which is welded to a relatively non-expanding or non-contracting metal; this end force causes a bending motion of the strip. For example, a bimetal strip for this electric motor may use nickel as one metal and the non-magnetic alloy K–500 Monel as the other metal. These two metals have temperature coefficients of expansion which are closely alike, while their magnetostrictive properties are widely different. In similar manner, other combinations of metals and other geometrical configurations may be employed to form a vibrating or oscillating element which is magnetostrictively actuated by a magnetic flux. Nickel has a negative coefficient of magnetostriction of approximately 30 parts in a million when magnetically saturated, while the K Monel alloy is non-magnetic and has a coefficient of magnetostriction of zero. By the use of these two metals in the bimetal strip there is very little undesired differing temperature effect and maximum desired differing magnetostrictive effect. In a similar manner other combinations of metals may be chosen and used in the bimetal strip. The magnetic permeability of nickel is approximately 3000 while that of K Monel is about 1, causing magnetic flux to seek a path through the nickel, thus insuring maximum magnetostrictive effect in this metal.

The location of bimetal reed 11 inside motor solenoid winding 13 is not critical, as the magnetic flux will seek the high permeability path through the magnetostrictive metal, wherever it is located. Referring to FIGURES 1 and 2, the solenoid motor winding 13 is composed of a plurality of turns of insulated electrically conducting wire 25 wound on a tubular bobbin 26 having supporting end pieces 27. These end pieces 27 are provided with projecting locating lugs 28 which fit into mating locating openings 29 in pivot plates 19, thus locating and fastening the motor winding in its position when plates 19 are assembled together.

With reference to FIGURE 2, a back-up pawl 38 is shown attached to clamp member 22. The pawl 38 will prevent a reverse rotation of wheel 16 under load while driving pawl 14 is being withdrawn on its return stroke, as is well known in the art. A weight 30 is shown attached to the freely vibrating end of reed 11 in the figures, for the purpose of resonating the reed 11 at a lower frequency than the reed natural frequency and thus enabling a shorter length of reed to be used, as is well known in the art. The weight 30 may be omitted if desired. The cross section of reed 11 in FIGURES 8 and 9 shows the two metals of the bimetal strip. For example, metal 31 may be nickel, while metal 32 may be K Monel alloy.

The operation of the motor of FIGURE 2 is described as follows: Alternating current flowing through coil 13 creates an alternating magnetic flux in the interior of this coil. The rising magnetic flux during the first quarter cycle of coil current takes the high permeability path through the magnetostrictive metal 31 of the bimetal reed 11, magnetically saturating the metal 31 and causing a negative magnetostrictive effect in it. The length of metal 31 contracts, while the length of metal 32 does not contract, thus causing a bending motion of reed 11 toward the ratchet wheel 16. The flat spring driving pawl 14 which is fastened to reed 11 engages a tooth 15 on wheel 16 and rotates the wheel 16 and shaft 17 until a tooth 15 passes the back-up pawl 38. As the magnetic flux subsides during the second quarter cycle of coil current and the magnetostrictive effect in metal 31 is reduced the length of metal 31 expands.

The metal 32, which had been stressed as a cantilever spring during the first quarter cycle of coil current, causes reed 11 to spring back to its original position. The inertia of the mass of reed 11 and weight 30 carries reed 11 past its original position, until the third quarter cycle of coil current creates a rising magnetic flux which saturates metal 31, contracting it and causing reed 11 to bend in the direction of wheel 16 again. Pawl 14 drives a tooth 15 again, and rotates wheel 16 and shaft 17 until a tooth 15 passes the back-up pawl 38. As the magnetic flux subsides during the fourth quarter cycle of coil current the reed 11 is returned past center position again as previously described for the second quarter cycle. The reed 11 therefore vibrates twice for one complete cycle of the alternating current input, and rotates the wheel 16 the angle of two teeth per cycle of the input alternating current.

The use of a diode 24 in series with coil 13 as shown in the schematic diagram of FIGURE 10 allows current to pass through coil 13 on one half of the alternating current cycle only. Under these conditions the reed 11 vibrates only once for each cycle of the alternating current input, so that wheel 16 is rotated the angle of one tooth per cycle of the input current. The output shaft speed of the half wave diode circuit of FIGURE 10 is therefore exactly one-half that of the full wave circuit of FIGURE 11. When using the circuit of FIGURE 10, the length of reed 11 and the mass of weight 30 are adjusted for mechanical resonance at the input alternating current supply frequency with resultant high amplitude of vibration of reed 11. For example, with 60 cycles per second A.C. supply, a reed approximately 4 inches long can have a peak to peak vibration amplitude of $5/32$ inch. The compliance of reed 11, together with the mass and length of the reed, determines its natural frequency, as is well known. The compliance of the reed is inversely proportional to its cross-sectional area. The weight 30 aids in minimizing the length of reed 11 for motor applications demanding minimum space factor. The power output of reed 11 is directly proportional to its cross-sectional area.

Figure 3:
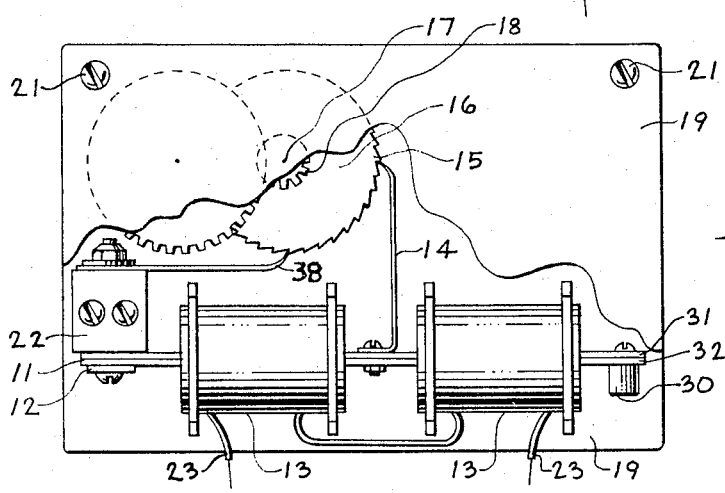
FIGURE 3 is a plan view partially broken away of an alternate type of electric motor showing the driving pawl attached to the center of the vibrating reed.

Referring to FIGURE 3, the driving pawl 14 is seen to be fastened to reed 11 at approximately its midpoint, in order to increase output power and decrease the ratchet wheel tooth size. Access to the center of reed 11 is enabled by dividing winding 13 into two parts as shown in FIGURE 3. Wheel 16 preferably has a large number of small teeth 15 in order to realize minimum output speed for a given input frequency, while an increase in the diameter of wheel 16 will increase power. For example, with 60 c.p.s. input current and half wave operation a wheel 16 with 240 teeth will have the low synchronous speed of 15 r.p.m.

Referring to FIGURES 4, 5, and 6, a preferable economical and simple construction of an integral electric motor and clock gear train is shown, which utilizes molded plastic mounting or pivot plates 19. Pivot bearings 31, coil retaining bosses 34 and spacers 20 are integrally molded in plates 19 and reed 11 is held in molded clamp members 22 as shown in FIGURE 5, which is a view on line 3—3 of FIGURE 4. Coil 13 is a plain cylindrical solenoid held between integrally molded coil retaining members 34. All pivot bearings for motor and clock gear train shaft pivots are integrally molded in pivot plates 19, as shown in FIGURE 6 which is an enlarged sectional view of pivot plates 19 on line 4—4 of FIGURE 4. In FIGURE 6, shaft pivot 17 can revolve in bearings 33, which are molded to the shape shown, having a guiding funnel shaped entrance portion 36, a radial sleeve bearing portion 33, and an end thrust bearing portion 35. The assembly of pivot 17 into bearing 33 is facilitated by its easy entrance into the guide portion 36; the construction is well suited for automatic assembly methods. This novel bearing construction costs no more to mold than a conventional cylindrical bearing, and enables the use of pivot plates 19 as the front and rear panel enclosures of a novel electric clock, the pivot plates having suitably molded outer surfaces including a dial and through hole for clock hands. FIGURE 7 shows a perspective view of such a clock, with front and rear pivot plate enclosures 19 and wrap-around cover piece 37 for enclosing the four remaining sides.

It can be understood that the method of molding the plates 19 with novel pivot bearings 33 on their inner surfaces and suitably molded outer surfaces to form exterior sides of a clock thus provides a very economical and simple construction adaptable to other similar devices.

As the basic magnetostrictive bimetal reed vibratory electric motor movement may be used by itself for purposes other than driving electric clocks, it is shown in FIGURES 8 and 9 in two alternate simple forms. Referring to FIGURE 8, a sectional view of a projecting cantilever type of simple vibratory motor is shown. In FIGURE 8, a molded plastic clamp and support or mounting member 22 firmly holds the fixed end of the cantilevered bimetal magnetostrictive reed 11 which extends through the center of motor coil 13. Coil 13 is wound on a bobbin formed on plastic support member 22, and is provided with lead wires 23 connecting to the external current supply, not shown. The bimetal reed 11 is composed of metals 31 and 32 having differing magnetostrictive coefficients. A weight 30 is shown attached to the free vibrating end of reed 11 for adjustment of resonant frequency as explained above. The weight 30 may be dispensed with and reed 11 may be operatively vibrated at its own resonant frequency, or may be vibrated at other non-resonant frequencies. The reed 11 may be electrostatically, electromagnetically, acoustically, optically, or mechanically coupled to other elements of a device to perform a useful function.

Referring to FIGURE 9, a sectional view of an alternate type of simple vibratory motor is shown in which the magnetostrictive bimetal reed 11 is held fixed at both ends, leaving the central portion of reed 11 free to vibrate. In FIGURE 9, dual support members 22 hold both ends of reed 11, and have integral bobbins formed on them to hold dual motor coils 13. Support members 22 are held by external means not shown and provide a space between coils 13 for access to the center of vibrating reed 11. The center of bimetal reed 11 will vibrate laterally under magnetic excitation from coils 13, and can be coupled to other elements of a device to perform a useful function. Reed 11 may be quite broad and thin, and coils 13 may be quite large in diameter to enable placement of other cooperating elements of a device within the coils 13 in close proximity to reed 11. The reed 11 may be electrostatically, electromagnetically, acoustically, optically, or mechanically coupled to other elements of a device to perform a useful function.

The supply current of the novel vibratory motor is not restricted to sine wave alternating current; other waveforms including pulse shapes may be employed. These pulse shaped waveforms may be derived from alternating or direct current by means well known to those skilled in the art.

It is well known in electrical engineering that an electric motor which when electrically driven delivers a mechanical output will furnish an electrical output when mechanically driven, although the efficiencies may differ.

The basic magnetostrictive bimetal reed vibratory motor movements shown in FIGURES 8 and 9 can deliver alternating electric current from coil 13 when the bimetal reed 11 is caused to vibrate by an external driving agent not shown. The external driving agent may be electromagnetically, acoustically, magnetically, or mechanically coupled to reed 11, to cause reed 11 to vibrate laterally. The bending motion of reed 11 under vibration causes a dimensional change in the magnetostrictive metal 31 which results in a change in its magnetic properties and a consequent change in the residual magnetic flux linking the turns of coil 13. This change in magnetic flux linkage generates an output voltage in coil 13, which may be connected to an external load not shown by means of leads 23.

The novel vibratory electric motor can therefore act as a generator or transducer, its coil furnishing electrical output to a load not shown when its vibrating reed is driven by an external agent.

Although specific embodiments of the invention have been illustrated and described, modifications thereof will be apparent to those skilled in the art, and it is intended to cover in the appended claims all such modifications as come within the spirit and scope of the invention.

I claim:

1. In combination: a vibratory electric motor and a gear train assembly located intermediate a pair of mounting plate means; said vibratory motor including magnetostrictively driven bimetallic vibrating reed means operatively secured intermediate said plate means, motor coil means positioned around at least a portion of said reed means and secured intermediate said plate means, driving pawl means operatively secured to said reed means and adapted to rotate in one direction a toothed wheel rotatably mounted intermediate said plate means, means mounted intermediate said plate means for preventing rotation of said tooth wheel in the opposite direction, said tooth wheel being drivingly connected with said gear train assembly, and weight means operatively connected to said reed means whereby said reed means is resonated at a lower frequency than the natural resonant frequency thereof.

2. The combination defined in claim 1, wherein said vibrating reed means is fixedly secured at both ends thereof, wherein said motor coil means comprises a pair of coils spaced along said reed means, and wherein said driving pawl means is secured to said reed means intermediate said pair of coils.

3. The combination defined in claim 1, wherein said bimetallic vibrating reed means is composed of strips of nickel and K Monel.

4. A vibratory electric motor comprising: a pair of plates secured in a spaced relationship with one another, a magnetostrictive bimetal reed operably secured intermediate said plates, motor coil means positioned around at least a portion of said reed and secured intermediate said plates, a toothed wheel rotatably secured intermediate said plate, output shaft means operatively connected with said toothed wheel, driving pawl means secured to said reed and positioned adjacent said toothed wheel and adapted for rotating same upon vibration of said reed by electric current being supplied to said motor oil means, said reed being provided with weight means whereby said reed is resonated at a lower frequency than the natural resonant frequency thereof, and means for preventing reverse rotation of said toothed wheel.

5. The vibrating electric motor defined in claim 4, wherein said vibrating reed is fixedly secured at both ends thereof, wherein said motor coil means comprises a pair of coils spaced along said reed means, and wherein said driving pawl means is secured to said reed means intermediate said pair of coils.

6. A vibratory electric motor assembly comprising: a pair of molded pivot plates retaining motor coil means, a bimetal vibrating reed, and an output shaft; said coil means surrounding at least a portion of and magnetostrictively driving said reed; said reed being operatively connected with a pawl operatively coacting with a toothed wheel on said output shaft for rotating said wheel and said output shaft in one direction; means mounted intermediate said pivot plates for preventing rotation of said wheel and output shaft in the opposite direction, said output shaft rotating in bearings molded into the inner sides of said pivot plates, said bearings being provided with a funnel shaped entrance portion, a cylindrically shaped central radial bearing portion, and a thrust pin portion at the center of the bottom of said bearings; said reed being provided with means which causes said reed to resonate at a frequency lower than the natural resonant frequency thereof.

References Cited

UNITED STATES PATENTS 3,127,529  3/1964  Barrett _____ 310—21
3,286,453  11/1966  Baehni _____ 310—26 XR MILTON O. HIRSHFIELD, *Primary Examiner.*

D. F. DUGGAN, *Assistant Examiner.*